United States Patent [19]

Bademian

[11] Patent Number: 4,540,245
[45] Date of Patent: Sep. 10, 1985

[54] APPARATUS AND METHOD FOR ACOUSTO-OPTIC CHARACTER GENERATION

[75] Inventor: Leon Bademian, Vienna, Va.

[73] Assignee: Isomet Corporation, Springfield, Va.

[21] Appl. No.: 550,590

[22] Filed: Nov. 10, 1983

[51] Int. Cl.³ .................... G02F 1/33; H04N 5/74
[52] U.S. Cl. .................... 350/358; 358/235
[58] Field of Search ........... 350/358, 371; 358/201, 358/235; 372/13

[56] References Cited

U.S. PATENT DOCUMENTS

| | | | |
|---|---|---|---|
| 2,267,251 | 12/1941 | Okolicsanyi | 178/7.5 |
| 3,568,102 | 3/1971 | Tseng | 333/30 |
| 3,625,600 | 12/1971 | Rowe | 350/161 |
| 3,633,995 | 1/1972 | Lean et al. | 350/358 |
| 3,698,794 | 10/1972 | Alphonse | 350/358 |
| 3,707,323 | 12/1972 | Kessler et al. | 350/358 |
| 3,727,062 | 4/1973 | Foster | 250/199 |
| 3,731,231 | 5/1973 | Torguet | 332/7.51 |
| 3,744,039 | 7/1973 | Hrbek et al. | 350/358 |
| 3,759,603 | 9/1973 | Eschler | 350/161 |
| 3,851,951 | 12/1974 | Eveleth | 350/358 |
| 3,900,851 | 8/1975 | Bucy et al. | 346/49 |
| 3,935,566 | 1/1976 | Snopko | 340/173 |
| 3,964,825 | 6/1976 | Eschler | 350/358 |
| 4,000,493 | 12/1976 | Spaulding et al. | 346/1 |
| 4,004,847 | 1/1977 | McNaney | 350/161 |
| 4,040,722 | 8/1977 | Nielsen | 350/161 |
| 4,053,898 | 10/1977 | Hirayama et al. | 346/1 |
| 4,054,367 | 10/1977 | Eschler et al. | 350/358 |
| 4,090,204 | 5/1978 | Farhat | 343/754 |
| 4,158,486 | 6/1979 | McNaney | 350/358 |
| 4,162,121 | 7/1979 | Starkweather et al. | 350/358 |
| 4,201,455 | 4/1980 | Vadasz et al. | 350/358 |
| 4,206,347 | 6/1980 | Avicola et al. | 455/608 |
| 4,213,158 | 7/1980 | DeBenedictis | 358/296 |
| 4,269,482 | 5/1981 | Mori | 350/358 |
| 4,321,564 | 3/1982 | Tregay | 350/358 |
| 4,332,441 | 6/1982 | Margolis | 350/358 |
| 4,370,029 | 1/1983 | Sprague et al. | 350/355 |

FOREIGN PATENT DOCUMENTS

| | | |
|---|---|---|
| 54-5752 | 1/1979 | Japan. |
| 54-139743 | 10/1979 | Japan. |
| 252668 | 2/1970 | U.S.S.R. . |

OTHER PUBLICATIONS

Cook et al., "A Numerical Procedure for Calculating the Integrated Acoustooptic Effect", IEEE Transactions on Sonics & Ultrasonics, vol. SU 27, No. 4, Jul. 1980.

Cook, "A Procedure for Calculating the Integrated Acousto-Optic (RAMAN-NATH) Parameter for the Entire Sound Field", 1979 Ultrasonics Symposium, IEEE, pp. 90-93.

Ingenito et al., "Theoretical Investigation of the Integrated Optical Effect Produced by Sound Fields Radiated from Plane Piston Transducers", Journal of the Acoustical Society of America, vol. 45, No. 3, 1969, pp. 572-577.

*Primary Examiner*—Bruce Y. Arnold
*Assistant Examiner*—Bruce S. Shapiro
*Attorney, Agent, or Firm*—Shapiro and Shapiro

[57] ABSTRACT

Acoustic energy column segments having predetermined frequencies and representing associated portions of a character are produced in one or more of a set of acoustic energy columns within a body of acousto-optic material in order to form an acoustic energy representation of the character within the body. A pulse of light is flashed through the character representation to create a plurality of diffracted light beams. The diffracted beams are directed to corresponding locations in a character reproduction plane to form an optical representation of the character in the reproduction plane.

20 Claims, 3 Drawing Figures

APPARATUS AND METHOD FOR ACOUSTO-OPTIC CHARACTER GENERATION

BACKGROUND OF THE INVENTION

The present invention relates to programmable optical character generators and is more particularly concerned with a method and apparatus for programmably generating optical characters by acousto-optic interaction.

Modern information processing applications frequently require character generation systems capable of accommodating a stream of character information which changes at very high speeds. Programmable optical character generators are particularly well suited to such applications.

Various programmable optical character generation systems are known in the prior art, including both mechanical and acousto-optic types. A typical mechanical system employed in laser marking applications utilizes a plurality of character stencils circumferentially disposed about a wheel. To generate a particular character, the wheel must be rotated to bring the corresponding stencil into the path of a laser beam. Such mechanical systems are inherently slow and undesirably elaborate due to the nature of the stencil mechanism and are thus not suitable for many information processing tasks.

Acousto-optic character generation systems are not subject to the limitations of mechanical systems and are capable of achieving considerably higher speeds. This is particularly true in the case of multi-channel acousto-optic systems wherein different portions of a character are generated simultaneously. Unfortunately, the multi-channel systems heretofore proposed are generally quite complex, typically relying upon such techniques as output beam scanning or two-dimensional acousto-optic arrays. A need has thus remained for an acousto-optic character generator which is capable of attaining the high speeds required by modern information processing and which avoids the undue complexities and other disadvantages associated with the prior art. The present invention meets this need.

SUMMARY OF THE INVENTION

In accordance with the present invention, a method and apparatus are provided whereby a plurality of optical characters may be simultaneously generated in their entirety in a programmable multi-channel acousto-optic system utilizing a single acousto-optic device. More specifically, according to a preferred form of the invention to be described hereinafter, an acoustic energy representation of each character to be generated is produced within a body of acousto-optic material by energizing acoustic transducer electrodes mounted on a face of the body. Individual electrodes are selectively energized to produce one or more acoustic energy column segments, each of a predetermined frequency and corresponding to a specific character portion. When a complete acoustic energy representation of each character has been produced and is present in the acousto-optic body, a pulse of light, such as from a laser, is flashed through the body to create a plurality of diffracted output beams corresponding to the acoustic energy column segments. The output beams, which are diffracted in different directions due to the different frequencies of the acoustic energy column segments, are directed to corresponding locations in a character reproduction plane by coacting converging and diverging lenses to create optical representations of the characters in the reproduction plane.

The features and advantages of the invention will be better understood from the following detailed description of the invention in which reference is made to the accompanying drawing.

DESCRIPTION OF THE PREFERRED EMBODIMENT

Figure 1:
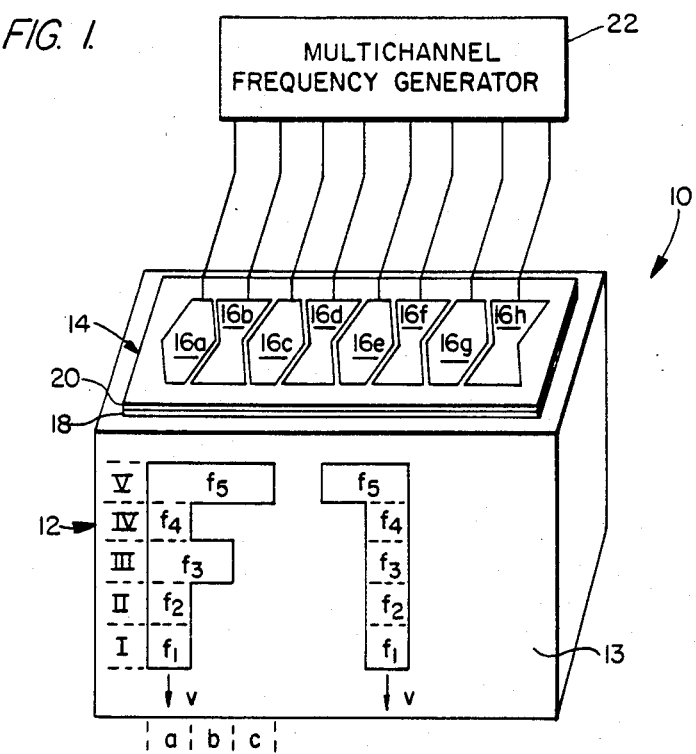
FIG. 1 is a diagrammatic view of apparatus in accordance with the invention and showing, in perspective, an acousto-optic device wherein acoustic energy representations of the characters F and 1 have been produced in accordance with the method of the invention.

FIG. 1 shows an acousto-optic device 10 in a preferred form for use in an acousto-optic character generator system in accordance with the invention. In the form shown, the acousto-optic device 10 comprises a body of conventional acousto-optic material 12 and acoustic energy column generating means 14 mounted on a face of the body 12. It should be noted that in the present example, the front face 13 of acousto-optic body 12 lies in a vertical plane, and acoustic energy column generating means 14 is located on top of the body 12. As illustrated in FIG. 1, generating means 14 preferably includes a common electrode 18, a plurality of control electrodes 16a-16h, which are connected to multi-channel frequency generator means 22 (e.g., a series of computer-controlled oscillators), and a layer of piezoelectric material 20 intermediate the common and control electrodes. In accordance with principles well understood in the art, control electrodes 16a-16h may be energized by multi-channel frequency generator means 22 to produce a set of acoustic energy columns within the body 12; and, as will be discussed in greater detail hereinafter, a light beam (such as from a laser) may be flashed through the acoustic energy columns within the body at an appropriate angle of incidence in order to create a plurality of diffracted light beams corresponding to the acoustic energy columns.

While it will be apparent from the ensuing discussion that numerous control electrode configurations may be employed in accordance with the invention, an electrode arrangement of the type shown in FIG. 1 offers significant advantages. More particularly, electrodes 16a-16h are positioned to form an overlapping electrode structure of the type described in detail in my copending U.S. patent application entitled, "Overlapping Electrode Structure For Multi-Channel Acousto-Optic Devices", Ser. No. 06/536,005, filed Sept. 26, 1983, hereby incorporated by reference. As is described more fully in the aforementioned application, the overlapping arrangement of electrodes 16a-16h offers several desirable performance characteristics. To summarize briefly here, each individual electrode generates an acoustic energy column which causes substantially the same Integrated Optical Effect (i.e., overall diffraction effect) on an incident light beam regardless of the position of the beam path beneath the electrode. In addition, each of the illustrated electrodes produces the same Integrated Optical Effect, thus providing a uniform Integrated Optical Effect across the entire electrode structure. The advantages of the foregoing performance characteristics in the context of the present invention will be addressed further later.

A further noteworthy feature in regard to the electrode structure shown in FIG. 1 is the nested arrangement of control electrodes 16a–16h. More specifically, electrodes 16a–16h are nested along a common horizontal center line parallel to front face 13 and positioned so that the acoustic energy columns produced by adjacent electrodes overlap, for example, at about their 50% intensity points. This permits the creation of corresponding diffracted light beams which overlap to the same degree (i.e., at about their 50% intensity points in the example stated). The concept of nesting is explained fully in my previously identified co-pending application.

The method of character generation according to the invention will now be described in connection with a character generator system incorporating an acousto-optic device of the form shown in FIG. 1. Broadly speaking, the preliminary step in generating characters by the method of the invention involves the creation of an acoustic energy representation within the acousto-optic body 12 of each character to be generated at a particular time. By way of example, FIG. 1 depicts acoustic energy representations of the characters F and 1 within body 12. The character F will be used for the purpose of explaining the principles of the invention in detail. To facilitate explanation of the invention, FIG. 1 also shows a coordinate system of five rows (designated I through V) and three columns (designated a through c) about the character F. This coordinate system will be used in referring to specific character portions in the following discussion. It is to be understood that the character F is used herein solely for illustrative purposes and that other characters may be generated in accordance with the invention in a manner similar to that described for the character F.

In accordance with the invention as indicated by the coordinate system in FIG. 1, the acoustic energy representation of the character F is divided into three columns a–c, each of which is produced by energizing a corresponding control electrode in the group 16a–16h. In the example shown, electrode 16a produces column a, electrode 16b produces column b, and electrode 16c produces column c. Furthermore, for reasons which will be explained more fully hereinafter, each character portion within a given column is represented by an acoustic energy column segment of predetermined frequency. Thus it will be seen, for example, that column a in the acoustic energy representation of the character F includes five acoustic energy column segments of frequencies f1–f5 corresponding to the character portions Ia–Va, respectively. Likewise, column b includes two acoustic energy column segments of frequencies f3 and f5 representing character portions IIIb and Vb, respectively; and column c contains a single acoustic energy column segment of frequency f5 which corresponds to character portion Vc. It should be noted that the acoustic energy column segments representing horizontally adjacent character portions (e.g., character portions Va, Vb and Vc) are produced at the same acoustic frequency. Also, for simplicity in operation and to enhance uniformity in appearance among the optical reproductions of the individual character portions, it is preferable that all of the acoustic energy column segments be of substantially the same length.

To create the acoustic energy representation of the character F just described, multi-channel frequency generator means 22 selectively energizes each of the electrodes 16a–16c at the proper frequencies to produce in sequence the individual segments of the corresponding acoustic energy columns. It will be appreciated that each acoustic energy column segment is produced at the top of acousto-optic body 12 and travels downwardly through the body 12 at the velocity of sound v (see FIG. 1) as succeeding column segments are produced until an entire travelling character representation has been generated. (It is to be understood, of course, that body 12 may have any orientation and that reference to any particular direction in the present discussion is merely for illustrative purposes.) So that all of the acoustic energy column segments have the same length, the electrodes 16a–16c are energized for time periods of the same duration, arbitrarily denoted as t for the purpose of discussion. The time t is predetermined taking into account the movement of the acoustic energy column segments through body 12 to ensure that all of the column segments representing the character F are present within the body at the same time. Thus the acoustic energy representation of the character F is preferably created by first energizing electrode 16a at frequency f1 for time t to produce an acoustic energy column segment corresponding to character portion Ia. Multi-channel frequency generator means 22 next energizes electrode 16a at frequency f2 for time t to produce an acoustic energy column segment representing character portion IIa. Thereafter, electrodes 16a and 16b are energized simultaneously for time t at frequency f3 to produce acoustic energy column segments corresponding to character portions IIIa and IIIb, respectively. Next, electrode 16a is again energized individually at frequency f4 for time t to produce an acoustic energy column segment corresponding to character portion IVa. Finally, electrodes 16a, 16b and 16c are energized simultaneously at frequency f5 for time t to produce three acoustic energy column segments respectively representing character portions Va, Vb, and Vc.

The final steps for obtaining an optical reproduction of the character F will now be described with reference to FIGS. 2 and 3. In accordance with the invention as depicted therein, a pulse of light such as from a pulsed laser is flashed through the acoustic energy character representation contained in the acousto-optic body 12. In the present example, when viewed in a horizontal plane, as in FIG. 3, the laser beam is incident upon the front face 13 of body 12 in a direction substantially perpendicular to the front face. When viewed in a vertical plane, as in FIG. 2, the beam is incident upon front face 13 at an angle appropriate for achieving diffraction. The laser beam is preferably of rectangular cross section and of sufficient width to pass beneath all of the control electrodes (see FIG. 3), which permits the generation of multiple characters with a single beam. The laser beam should be of sufficient height to pass through the entire length of the acoustic energy columns produced by the control electrodes, as shown in FIG. 2, so as to illuminate the entire character representation as it travels downward through body 12.

Figure 2:
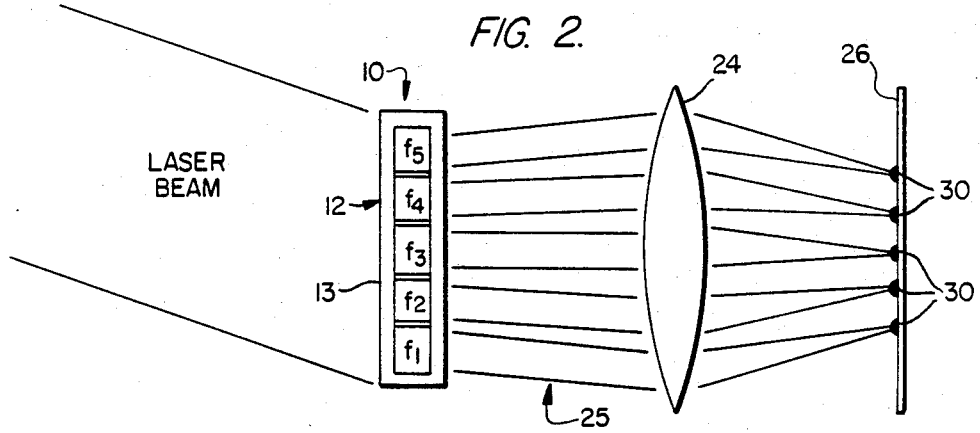
FIG. 2 is a diagrammatic side elevation view of an acousto-optic character generator system in accordance with the invention.

When the laser beam passes through the acoustic energy representation of the character F, which is oriented substantially parallel to front face 13 of acousto-optic body 12, it is split into a plurality of pulsed diffracted light beams 25 according to generally understood acousto-optic principles, as is depicted in FIG. 2. Each diffracted beam so produced corresponds to a particular acoustic energy column segment and, therefore, to the particular character portion represented by that column segment. In addition, as will be apparent from FIG. 2, each diffracted beam exits the acousto-optic body 12 at an angle relative to vertical which is determined by the frequency of the corresponding acoustic energy column segment. As viewed in a horizontal plane, the diffracted beams 25 have the same direction as the incident laser beam as they emerge from body 12. It will be understood that because the acoustic energy column segments representing horizontally adjacent character portions are produced at the same frequency as noted earlier, the diffracted beams corresponding to such column segments will travel at the same angle relative to vertical.

To form an optical reproduction of the character F, the diffracted beams 25 are directed to corresponding locations in a character reproduction plane 26 by converging and diverging lenses 24 and 28, respectively, which are located beyond the acousto-optic device 10 in the path of the diffracted beams 25. (To avoid confusion, diverging lens 28 is not depicted in FIG. 2.) In the present example, converging lens 24 is a spherical convex lens and diverging lens 28 is a cylindrical lens. As shown in FIG. 2, the character reproduction plane 26 is preferably located at the focal plane of converging lens 24 so that (ignoring the effect of diverging lens 28 for the moment) any diffracted light incident upon converging lens 24 at a given angle relative to vertical will be focused to a corresponding fixed spot at the character reproduction plane in accordance with the generally known characteristics of such lenses. Thus, lens 24 acts to focus the diffracted beams 25 created by acousto-optic device 10 to corresponding fixed spots 30 in the character reproduction plane 26 as illustrated in FIG. 2. It will be appreciated, of course, that the convergence effect of lens 24 is two-dimensional. That is, lens 24 provides a vertical convergence effect as in FIG. 2 and a horizontal convergence effect as in FIG. 3.

Figure 3:
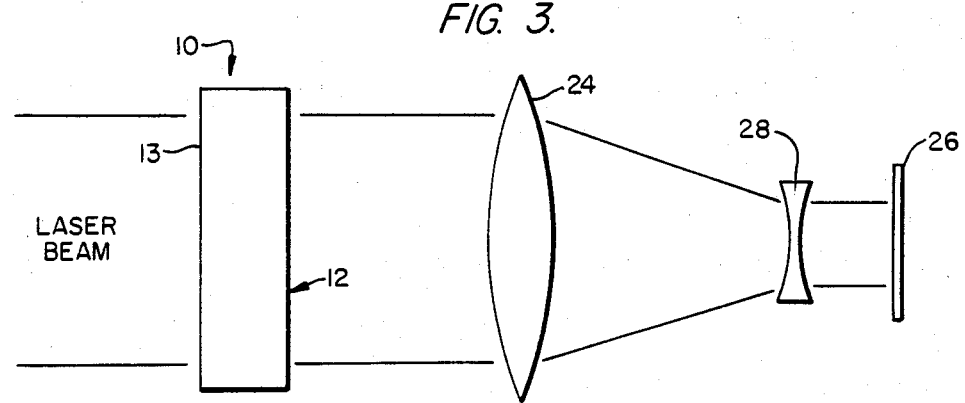
FIG. 3 is a diagrammatic plan view of an acousto-optic character generator system in accordance with the invention.

In accordance with the invention as shown in FIG. 3, diverging lens 28 is interposed between lens 24 and the character reproduction plane 26 to compensate the aforementioned horizontal convergence effect. More particularly, diverging lens 28 prevents diffracted beams corresponding to horizontally adjacent character portions from converging to the same spot in the reproduction plane 26 (as would occur if converging lens 24 were not compensated) and maintains such beams in proper horizontal relationship. The proper vertical positions of the diffracted beams 25 in reproduction plane 26, on the other hand, are established by the vertical convergence effect of lens 24, which is not altered by diverging lens 28 (which as noted earlier is preferably cylindrical). Hence, it will be appreciated that by virtue of lenses 24 and 28, the diffracted beams 25 representing the character F will impinge upon character reproduction plane 26 in relative positions corresponding to those of their associated character portions, thereby forming an optical representation of the character F in the reproduction plane 26. It should be noted that by using cylindrical lenses having different radii of curvature, the horizontal breadth of diffracted beams 25 in character reproduction plane 26, and therefore the horizontal breadth of the optical character, may be changed as desired.

With the preceding discussion in mind, it will be apparent that the present invention avoids the optical smearing effect that would result if only a single frequency were used in producing acoustic energy character representations. In such a case, the diffracted light representing a particular character would travel at a single angle relative to vertical and the use of a converging lens as described herein would be to no avail since all of the diffracted light would be directed to a single spot in the character reproduction plane. Any vertical movement of the acoustic energy character representation while exposed to an incident light beam would thus translate into vertical movement of the optical character in the reproduction plane. In order to avoid perceptible movement of the optical character (i.e., smearing), an incident light pulse short enough in duration effectively to "freeze" the position of the acoustic energy character representation would be required. Of course, the light pulse would also have to be of sufficient intensity to provide an optical character of adequate brightness. Practical laser systems unfortunately do not provide light pulses having such characteristics. Nevertheless, it is possible to take advantage of practical laser systems with the present invention.

Referring again to the illustrative character F, it will be observed that although the acoustic energy column segments representing the character move downwardly through acousto-optic body 12 so that the diffracted beams 25 emerging from the body likewise move downwardly, the different beams are nonetheless "frozen" at the character reproduction plane 26 by the action of converging lens 24. More particularly, because the respective angles of the diffracted beams 25 relative to vertical are fixed by the frequencies of the corresponding acoustic energy column segments, the vertical convergence effect of lens 24 locates each beam at a fixed vertical position in the character reproduction plane 26. Smearing of the optical character is thereby avoided.

It should now be apparent that in order to reproduce a particular character with high accuracy, it is desirable to represent each character column with a substantial number of acoustic energy column segments (and a corresponding number of acoustic frequencies). With a carefully designed control electrode structure such as that shown in FIG. 1, long sound columns can be maintained within acousto-optic body 12 with minimal degradation. This permits the use of as many column segments as possible with lengths suitable for obtaining distinct, resolvable focused spots at the character reproduction plane 26. Thus, while the illustrative acoustic energy character representations depicted in FIG. 1 include acoustic energy columns containing up to five column segments, a greater number of column segments may be used to advantage in practice.

The apparatus and method of the invention described herein will be useful in a wide range of applications. For example, the invention may be employed in $CO_2$ laser marking systems to replace the slow and complex mechanical programmable systems now in use. Other applications of the invention could include generation of bar codes, printing addresses without the use of labels (i.e., directly on a product carton), product serialization or any other application wherein high speed code or alphanumeric changes are desired. Using a commercially available TEA (Transversely Excited Atmospheric Pressure) laser operating at 25 pulses per second and, for example, an acousto-optic device of the type described herein capable of generating as many as seven or eight acoustic energy character representations simultaneously, programmable optical character generation capabilities approaching 200 characters per second may be obtained in accordance with the invention.

While a preferred form of the invention has been shown and described, it will be apparent to those skilled in the art that changes can be made within the scope of the invention which is defined in the appended claims. For example, it will be apparent that the acoustic energy column segments within a given column of a character representation may be produced in any desired order since it is the frequency of each column segment (and not its position in the column) which determines the angle of the corresponding diffracted beam and the location at which the beam will be fixed in reproduction plane 26 by converging lens 24. As long as the acoustic energy column segment representing a particular character portion is produced at a specific frequency, converging lens 24 will properly locate the corresponding diffracted beam in reproduction plane 26.

I claim:

1. An acousto-optic character generator system, comprising:
   (a) multi-channel frequency generator means,
   (b) a body of acousto-optic material,
   (c) means conneted to said frequency generator means for sequentially producing within said body, in one or more of a set of acoustic energy columns, a plurality of traveling acoustic energy column segments each having a different predetermined acoustic frequency and representing an associated portion of a character to be generated,
   (d) means for flashing a discrete pulse of light through said body containing said acoustic energy column segments to create a plurality of pulsed diffracted light beams, and
   (e) means for directing said pulsed diffracted light beams to a corresponding plurality of fixed locations in a character reproduction plane to create in said plane optical representations of the portions of the character to be generated.

2. An acousto-optic character generator system as recited in claim 1, wherein said means for producing acoustic energy column segments comprises a plurality of acoustic transducer electrodes mounted at a side of said body.

3. An acousto-optic character generator system as recited in claim 2, wherein said plurality of acoustic transducer electrodes includes electrodes in a nested arrangement.

4. An acousto-optic character generator system as recited in claim 1, wherein said means for flashing a pulse of light comprises a pulsed laser.

5. An acousto-optic character generator system as recited in claim 1, wherein said means for directing said diffracted light beams comprises converging lens means having a focal plane coincident with said character reproduction plane.

6. An acousto-optic character generator system as recited in claim 5, wherein said means for directing said diffracted light beams includes diverging lens means interposed between said converging lens means and said character reproduction plane.

7. An acousto-optic character generator system as recited in claim 1, wherein said means for producing acoustic energy column segments comprises a plurality of acoustic transducer electrodes mounted at a side of said body, said means for flashing a pulse of light comprises a pulsed laser, and said means for directing said diffracted light beams comprises converging lens means having a focal plane coincident with said character reproduction plane.

8. An acousto-optic character generator system as recited in claim 7, wherein said means for directing said diffracted light beams includes diverging lens means interposed between said converging lens means and said character reproduction plane.

9. An acousto-optic character generator system as recited in claim 7, wherein said plurality of acoustic transducer electrodes includes electrodes in a nested arrangement.

10. An acousto-optic character generator system as recited in claim 1, wherein said pulse of light is of sufficient height to illuminate the entirety of said plurality of acoustic column segments as the same travel through said body.

11. A method of acousto-optic character generation, comprising:
    (a) sequentially producing in one or more of a set of acoustic energy columns within a body of acousto-optic material, a plurality of traveling acoustic energy column segments each having a different predetermined acoustic frequency and representing an associated portion of a character to be generated,
    (b) flashing a discrete pulse of light through said acousto-optic body containing said acoustic energy column segments to create a plurality of pulsed diffracted light beams, and
    (c) directing said pulsed diffracted light beams to a corresponding plurality of fixed locations in a character reproduction plane to create in said plane optical representations of the portions of the character to be generated.

12. A method of acousto-optic character generation as recited in claim 11, wherein said producing comprises energizing one or more of a group of acoustic transducer electrodes during selected time periods and at selected acoustic frequencies.

13. A method of acousto-optic character generation as recited in claim 12, wherein said producing includes generating acoustic energy column segments in overlapping acoustic energy columns.

14. A method of acousto-optic character generation as recited in claim 11, wherein said flashing comprises pulsing a laser.

15. A method of acousto-optic character generation as recited in claim 11, wherein said directing comprises passing said diffracted light beams through converging lens means having a focal plane coincident with said character reproduction plane.

16. A method of acousto-optic character generation as recited in claim 15, wherein said directing includes passing said diffracted light beams through diverging lens means interposed between said converging lens means and said character reproduction plane.

17. A method of acousto-optic character generation as recited in claim 11, wherein: said producing comprises energizing one or more of a group of acoustic transducer electrodes during selected time periods and at selected acoustic frequencies, said flashing comprises pulsing a laser, and said directing comprises passing said diffracted light beams through converging lens means having a focal plane coincident with said character reproduction plane.

18. A method of acousto-optic character generation as recited in claim 17, wherein said directing includes passing said diffracted light beams through diverging lens means interposed between said converging lens means and said character reproduction plane.

19. A method of acousto-optic character generation as recited in claim 18, wherein said producing includes generating acoustic energy column segments in overlapping acoustic energy columns.

20. A method of acousto-optic character generation as recited in claim 11, wherein said flashing includes flashing a pulse of light of sufficient height to illuminate the entirety of said plurality of acoustic energy column segments as the same travel through said body.

* * * * *